United States Patent [19]

Welschof

[11] 4,008,582
[45] Feb. 22, 1977

[54] CONSTANT VELOCITY UNIVERSAL JOINT

[75] Inventor: Hans-Heinrich Welschof, Rodenbach, Germany

[73] Assignee: Lohr & Bromkamp GmbH, Offenbach (Main), Germany

[22] Filed: June 2, 1975

[21] Appl. No.: 582,815

[30] Foreign Application Priority Data

June 22, 1974 Germany .......................... 2430027

[52] U.S. Cl. ........................................ 64/21; 64/8; 64/7
[51] Int. Cl.² .......................................... F16D 3/30
[58] Field of Search .............................. 64/8, 7, 21

[56] References Cited

UNITED STATES PATENTS

| 3,442,095 | 5/1969 | Devos | 64/21 |
|---|---|---|---|
| 3,664,152 | 5/1972 | Mocielinski | 64/21 |
| 3,688,521 | 9/1972 | Smith et al. | 64/21 |
| 3,875,762 | 4/1975 | Tampalini | 64/21 |

FOREIGN PATENTS OR APPLICATIONS

| 962,454 | 7/1964 | United Kingdom | 64/21 |

Primary Examiner—Samuel Scott
Assistant Examiner—Randall Heald
Attorney, Agent, or Firm—Edmund M. Jaskiewicz

[57] ABSTRACT

A constant velocity universal joint comprises an outer joint member having a plurality of grooves in the surface of a cylindrical bore therethrough. An inner joint member within the bore has grooves on its outer surface opposing the outer member grooves and a ball is positioned in each pair of opposed grooves. A cage between the joint members has a plurality of openings spaced to position the centers of the balls in a plane perpendicular to the axis of the cage. The inner spherical surface of the cage is guided upon the outer spherical surface of the inner joint member and the cage also has an outer spherical surface. The centers of the spherical surfaces of the cage are equidistant on opposite sides of the ball plane. One or more axially extending second grooves in the surface of the outer joint member bore are so disposed that each of said second grooves is between two adjacent ball grooves in the bore. A key is positioned within each one of the second grooves to engage the outer spherical surface of the cage. The key or keys are restrained against axial displacement or may have limited axial displacement.

9 Claims, 7 Drawing Figures

CONSTANT VELOCITY UNIVERSAL JOINT

The present invention relates to a constant velocity universal joint, more parrticularly, to such a joint of the fixed or sliding type wherein a preassembled unit comprising the cage, inner joint member and torque transmitting elements may be assembled in the outer joint member.

One form of a constant velocity torque transmitting universal joint comprises an outer joint member having a cylindrical bore therethrough and a plurality of grooves in the surface of the bore. An inner joint member is disposed within the bore and has a corresponding plurality of grooves in the outer surface thereof opposing the outer joint member grooves so as to define a plurality of pairs of opposed grooves. Torque transmitting means are jointly received in each pair of opposed grooves and a cage is between the joint members with the torque transmitting means being retained in openings in the cage such that the centers of the torque transmitting means are located in a plane perpendicular to the axis of the cage. The cage is further provided with outer and inner spherical surfaces and the cage inner spherical surface is guided on the outer spherical surface of the inner joint member. The centers of the cage spherical surfaces are located equidistantly on opposite sides of the plane passing through the centers of the torque transmitting means.

In such a universal joint which is of the non-sliding or fixed type, the outer joint member must be split or divided in a plane transversely of the longitudinal axis of the joint in order to permit a preassembled unit comprising the cage, the inner joint member and the torque transmitting elements to be fitted within the outer joint member of the joint. Such a splitting of the outer joint member is necessary because in order to secure this preassembled unit against axial placement within the outer joint member there must be provided a fixed stop or abutment. A further stop or abutment is formed on the other portion of the outer joint member. In the case where such a universal joint is in the form of a sliding joint, the ball retaining cage is normally guided by its outer spherical surface within the cylindrical bore of the outer joint member.

Even when such a constant velocity universal joint has the centers of the cage spherical surfaces located at the bending or deflection center of the joint so as to form a non-sliding or fixed joint, the same limitation as described above will also apply.

A major disadvantage to such a universal joint is that the outer joint members of sliding and fixed joints cannot be interchanged. In addition, the splitting or dividing of the outer joint member which necessitates forming this member in two parts requires a relatively large space for purposes of central alignment and for axially positioning the components with respect to each other. In addition, special steps or construction are required in order to seal properly the two parts of the outer joint member in order to prevent the leakage of lubricant therefrom.

It is therefore the principal object of the present invention to provide an improved constant velocity universal joint which may be readily adapted for use as a sliding or non-sliding joint.

It is another object of the present invention to provide such a universal joint which does not involve special manufacturing procedures but whose manufacture is simplified, particularly with respect to a desired range of tolerances.

It is a further object of the present invention to provide such a universal joint having a simplified construction particularly with respect to the aligning and sealing of the several components.

The objects of the present invention are attained and the disadvantages of the prior art as described above are overcome by the present invention wherein in one aspect thereof a constant velocity universal joint of the type as described above is provided with at least one groove in the surface of the cylindrical bore passing through the outer joint member. This groove extends axially of or parallel with the grooves for the torque transmitting elements and is positioned between pairs of adjacent torque transmitting element grooves. Where the universal joint is of the fixed or non-sliding type a key is fitted in the groove and retained against axial displacement therein. The key engages with a portion of the outer spherical surface of the cage. Where the universal joint is of the sliding type a key positioned in the groove is restrained to limited axial displacement. At least three grooves and keys within the grooves may be provided with the keys being fixed against axial displacements and being provided with longitudinal concave surfaces corresponding to the convex outer spherical space of the cage. The keys may also be slidable within their grooves for a limited range of axial displacement and retain the cage by the corresponding surface configurations of the outer spherical surface of the cage and the surfaces of the keys contacting this cage surface.

The present invention thus provides that interchanged single form of an outer joint member can be inerchanged between sliding and non-sliding constant velocity universal joints of the type described above. Further, the grooves for the keys may be formed in a single manufacturing operation, such as by broaching, together with the grooves being formed for the torque transmitting elements. Thus, no additional work is necessary nor is an additional manufacturing step required to form the grooves for the keys. In addition, manufacturing tolerances need not be so close if the keys also function to guide the cage since the required clearance in order to provide proper functioning of the joints can be readily determined by an appropriate selection of the keys.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 2:
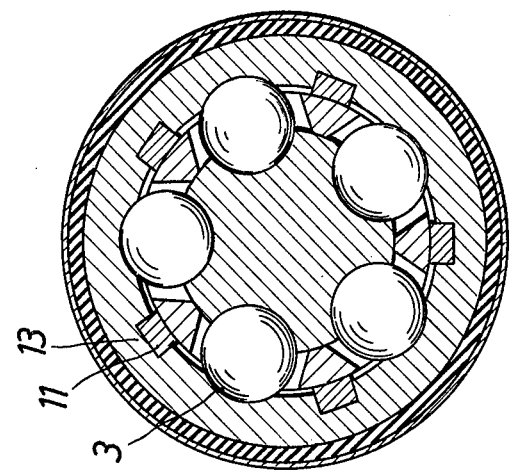
FIG. 2 is a sectional view taken along the line II—II of FIG. 1.
Figure 1:
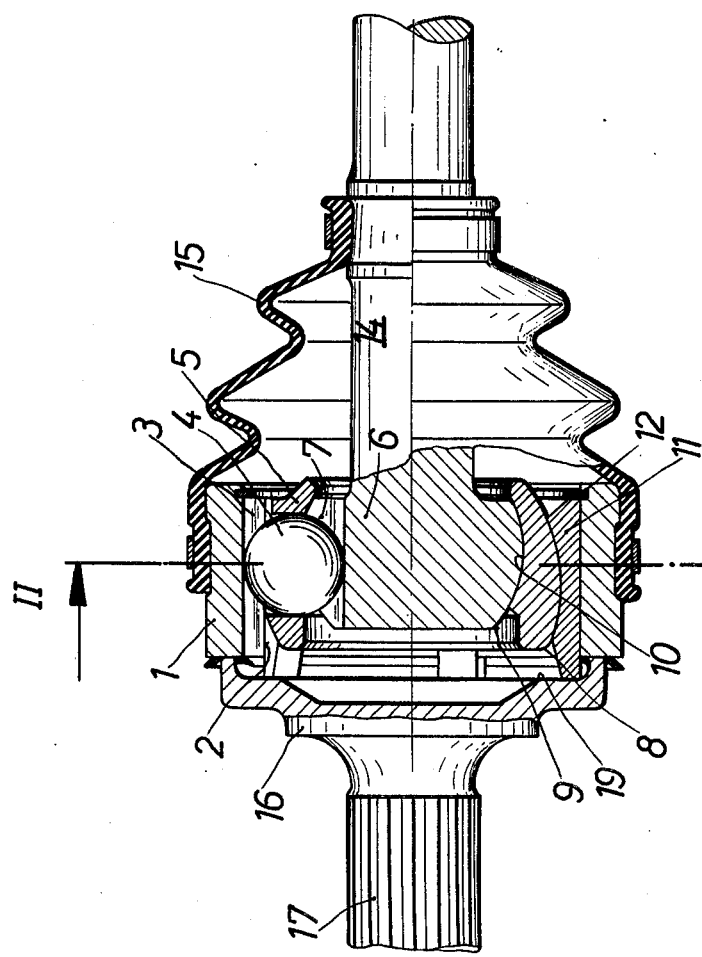
FIG. 1 is a longitudinal sectional view of a non-sliding constant velocity universal joint incorporating the grooves and keys according to the present invention.

In FIGS. 1 and 2 there is illustrated a non-sliding joint having an outer joint member 1 through which extends axially a cylindrical bore 2. A plurality of circumferentially spaced grooves 3 are formed in the inner surface of the cylindrical bore 2 and extend parallel with the longitudinal axis of the bore 2. Within the cylindrical bore 2 is an inner joint member 6 having an outer convex spherical surface 9 within which are formed a corresponding plurality of longitudinally extending grooves 7. The number of grooves 3 in the outer joint member corresponds to the number of grooves 7 in the inner joint member and these grooves are positioned so as to be opposed from each other so as to form pairs of opposed grooves.

A cage 5 is formed with an inner concave spherical surface 10 which is guided upon the outer spherical surface 9 of the inner joint member 6. The cage 5 also has an exterior convex spherical surface 8. The cage 5 is also provided with a plurality of circumferentially spaced apertures in which are retained balls 4 which transmit driving torque and which are also received in each pair of opposed grooves 3 and 7 of the outer and inner joint members 1 and 6 respectively.

Between each pair of adjacent ball grooves 3 in the outer joint member 1 there is provided a further groove 13 which extends axially with respect to the joint and is parallel to the ball grooves 3. The effect is that each ball groove 3 is succeeded by a groove 13 so that the ball grooves 3 and key grooves 13 alternate around the inner surface of the cylindrical bore. Within each groove 13 there is received a key or wedge member 11. The surfaces of the keys 11 facing toward the cage 5 have a configuration corresponding to the exterior spherical surface 8 of the cage 5. The keys 11 are retained axially in the grooves 13 by a spring clip or retaining ring 12 at one end of the keys and on the other end by the keys abutting against an end face 19 of a flange 16 which is connected with the outer joint member 1 and from which extends a shaft 17 comprising either the driving or the driven element.

According to the present invention two retaining clips or rings may be provided at both ends of the keys 11.

Also, the keys 11 can be rigidly connected to the flange 16 to thus function to transmit torque.

By utilizing the keys 11, the inner joint member 6 may be non-detachably connected to or made in one piece with the shaft 14. For sealing purposes, a flexible boot 15 as known in the art, is provided and has both ends secured to the outer joint member 1 and to the shaft 14 respectively.

In the universal joint shown in FIG. 1, the centers 01 and 02 of the inner spherical surface 10 and the outer spherical surface 8 respectively of the cage 5 are located at points which are offset equidistantly on opposite sides of the joint and bending centers 0 through which extends a plane passing through the centers of the torque transmitting balls 4.

The grooves 13 in the outer joint member 1 may be formed by a broaching or similar operation during the operation in which the grooves 3 are formed for the torque transmitting balls 4.

According to the present invention it is also possible for the cage 5 to be guided exclusively along the keys 11 or additionally upon the surface of the cylindrical bore 2.

Figure 3:
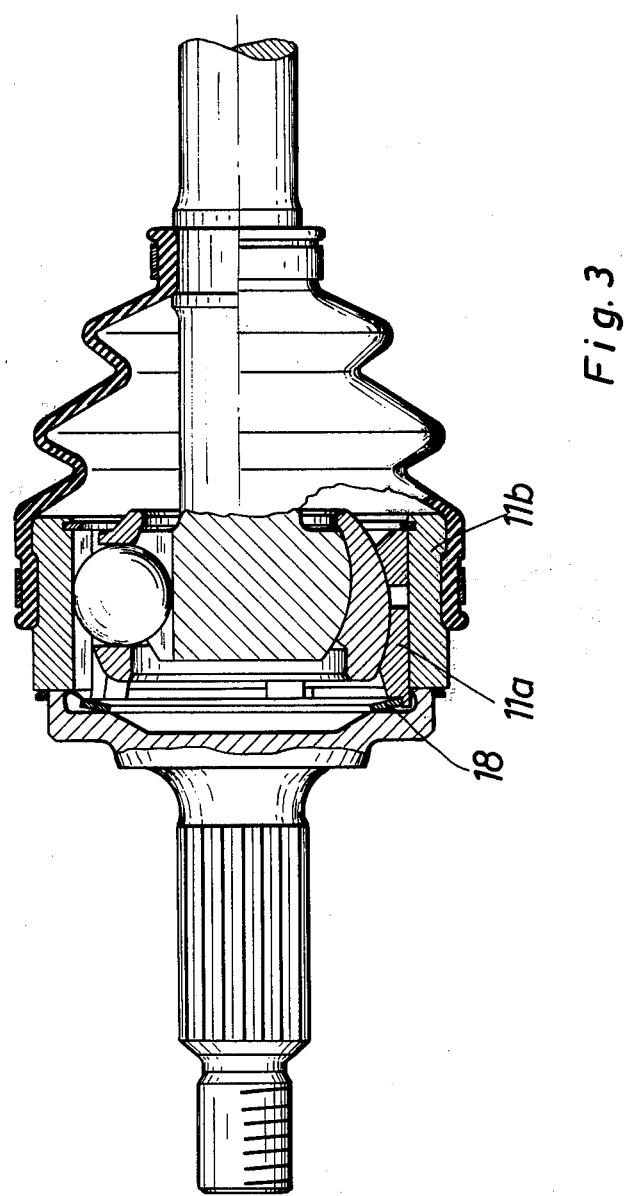
FIG. 3 is a view similar to that of FIG. 1 of a non-sliding joint but using divided keys.

In FIG. 3 there is shown a non-sliding type of constant velocity universal joint which is similar to the joint of FIGS. 1 and 2 but wherein the keys are split or divided into two axial key portions 11a and 11b. Thus, two of these key portions are positioned in each of the grooves 13. An annular spring plate 18 acts upon key portion 11a to urge this key portion in the direction toward the outer key portion 11b. This arrangement enables manufacturing tolerances to be overcome and shocks in the universal joint to be absorbed.

Figure 4:
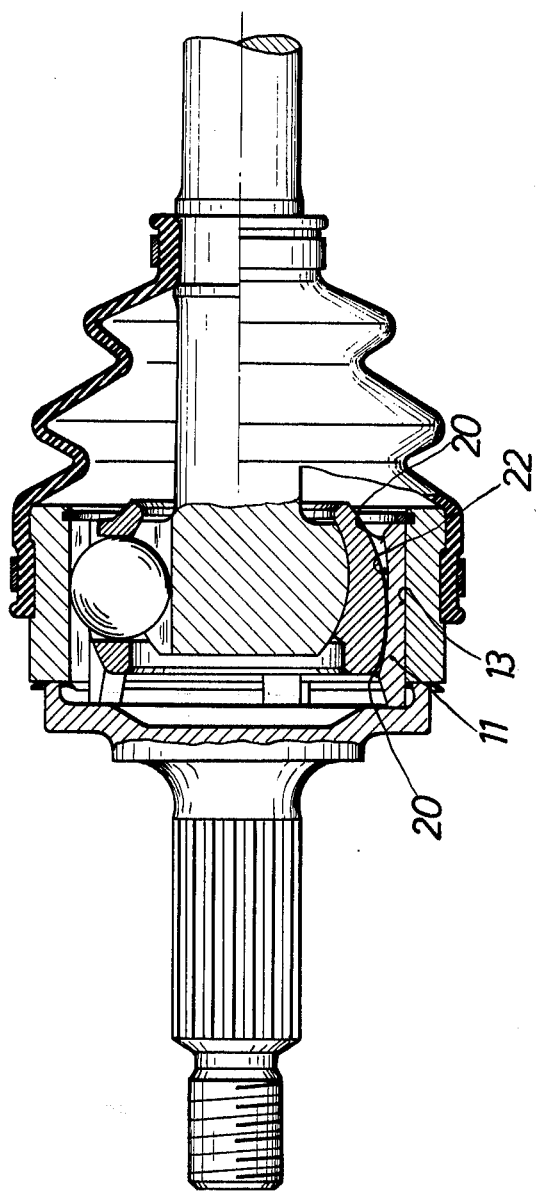
FIG. 4 is a view similar to that of FIG. 1 but of a sliding joint employing still a further form of the keys.
Figure 5:
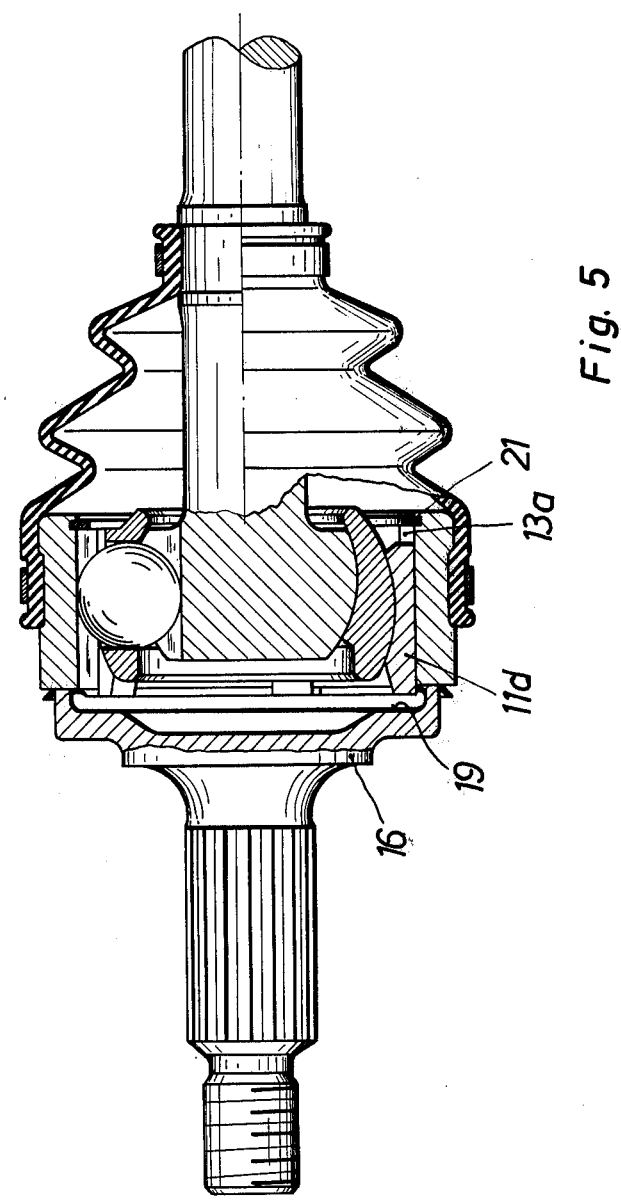
FIG. 5 is a view similar to that of FIG. 1 of a sliding joint wherein the keys are axially displaceable within their grooves.

The constant velocity universal joints shown in FIGS. 4 and 5 are similar to the universal joints of FIGS. 1 and 2 but are intended as sliding joints wherein the inner and outer joint members 6 and 1 are capable of relative axial movement. In FIG. 4, this relative axial displacement is achieved by providing key 11 with a longitudinal spline groove 22 which has curved end portions 20 for engaging the outer spherical surface 8 of the cage 5. The keys 11 are retained against axial displacement within their grooves 13 and thus the movement of the cage 5 is limited.

According to the present invention the keys 11 have an inner concave configuration which conforms to the convex outer spherical surface of the cage 5. As a result, there is achieved a closely fitting face-to-face contact between the cage and the keys 11. In sliding joints having the prior art construction as described above it was found that the linear contact between the cage outer spherical surface and the cylindrical bore involved increased friction wear and thus resulted in inaccurate alignment control for the cage. As a result, the torque transmitting elements retained by the cage were no longer retained in the homokinetic plane. As a result, parallel operation of the driving and driven elements was not possible and the torque transmitting elements no longer form uniformly distributed operating loads. This drawback has been eliminated by the present invention.

In the universal joint of FIG. 5, there is provided a key 11d which corresponds to the key 11 of FIG. 1 but which is axially displaceable a limited distance within the groove 13. This axial displacement corresponds with the desired distance of relative axial displacement between the inner and outer joint members. The axial displacement of the keys 11 is limited at one end by abutment on end face 19 of the flange 16 and on the other hand by retaining ring 21. The particular advantage of this arrangement is that there is interfacial contact between the outer spherical surface of cage 5 and the key members 11d.

Figure 7:
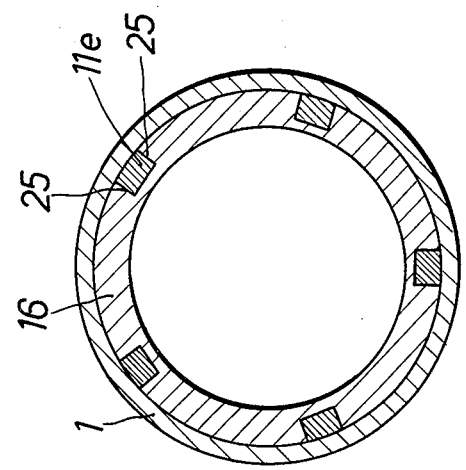
FIG. 7 is a sectional view taken along the line III—III of FIG. 6.
Figure 6:
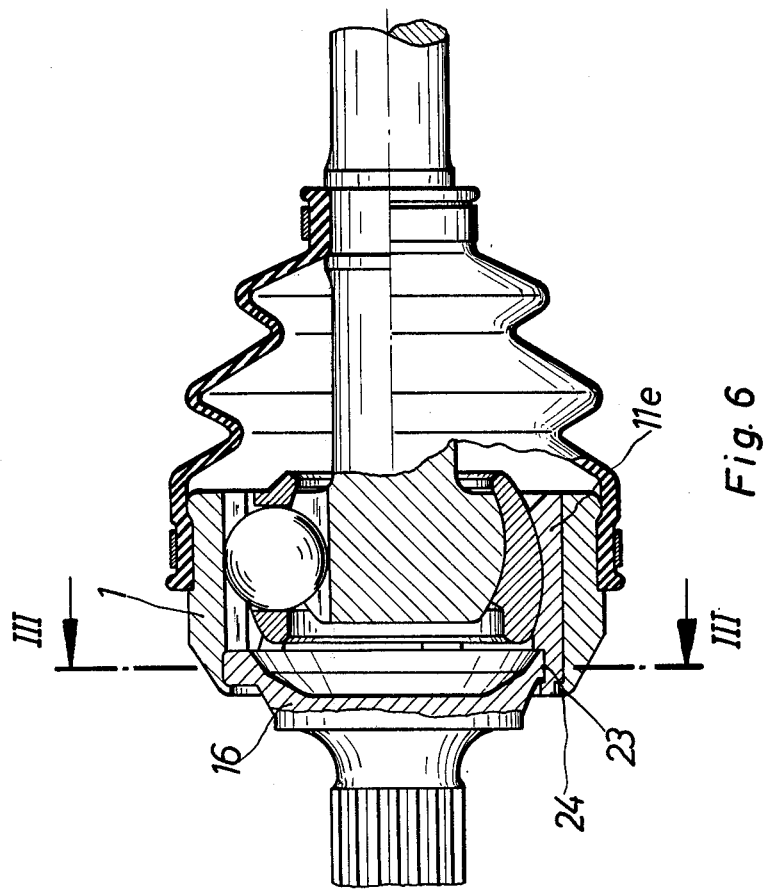
FIG. 6 is a view similar to that of FIG. 1 of a non-sliding joint showing still a further modification of the key structure.

In FIGS. 6 and 7 there is illustrated a constant velocity universal joint of the non-sliding or fixed type. Keys 11e are received in axially extending grooves 25 formed in the inner surface of the outer joint member 1 and are fixed against axial displacement in one direction by apertures 23 in the flange 16 from the shaft 17. A driving connection between the outer joint member 1 and the shaft 17 is achieved by means of the collar 24 being applied under pressure. As a result, thre is no further relative sliding displacement between the flange 16 and the outer joint member 1.

Thus it can be seen that the present invention has disclosed a constant velocity universal joint the outer joint member of which can be interchanged between such universal joints of the sliding or non-sliding types.

It will be understood that this invention is susceptible to modification in order to adapt it to different usages and conditions, and accordingly, it is desired to comprehend such modifications within this invention as may fall within the scope of appended claims.

What is claimed is:

1. A constant velocity torque transmitting universal joint comprising an outer joint member having a cylindrical bore therethrough and a plurality of grooves in the surface of said bore, an inner joint member within said bore and having a corresponding plurality of grooves in the outer surface thereof opposing said outer joint member grooves, means jointly received in each pair of opposed inner and outer grooves for transmitting torque therebetween, a cage between said joint members and having a plurality of openings therein spaced to correspond with said pairs of opposed grooves to dispose the centers of said torque transmitting means in a plane perpendicular to the axis of the cage, said cage having a first spherical surface on its outer face and a second spherical surface on its inner face, means on the outer surface of said inner joint member coacting with said cage second spherical surface for guiding said cage with respect to said inner joint member, the centers of said first and second cage spherical surfaces being equidistant on opposite sides of said plant passing through the centers of said torque transmitting means, there being axially extending second grooves in the surface of said outer joint member bore and a said second groove disposed between two adjacent torque transmitting means grooves in said bore surface, keys within said second grooves engaging the outer spherical surface of said cage to guide said cage, and means for restraining said key to one of no axial displacement or limited axial displacement.

2. A constant velocity universal joint as claimed in claim 1 wherein the universal joint is a fixed joint and said key is restrained against axial displacement, said key engaging a portion of said cage outer spherical surface.

3. A constant velocity universal joint as claimed in claim 1 wherein the universal joint is a sliding joint and said key has limited axial displacement.

4. A constant velocity universal joint as claimed in claim 1 wherein there are three of said second grooves and a said key in each of said second grooves restrained against axial displacement therein, each key having a longitudinally extending concave groove engaging the spherical outer surface of said cage.

5. A constant velocity universal joint as claimed in claim 1 wherein there are three of said second grooves and a said key in each of said second grooves, said keys having limited axial displacement within said grooves, the surfaces of said keys engaging said cage outer spherical surface conforming to said outer spherical surface to retain said cage.

6. A constant velocity universal joint as claimed in claim 1 wherein the cage outer spherical surface engages said cylindrical bore surface so as to be guided thereby.

7. A constant velocity universal joint as claimed in claim 1 wherein there are two axially disposed key portions in each of said second grooves, and spring means acting against ones of said axial key portions for urging said one key portions toward the respective others of said two key portions.

8. A constant velocity universal joint as claimed in claim 1 wherein each key has a concave configuration corresponding to the convex outer spherical surface of said cage.

9. A constant velocity universal joint as claimed in claim 1 wherein the universal joint comprises a driving element connected to one of said outer or inner joint members and a driven element connected to the other of said joint members, said key being rigidly but detachably connected to a portion of the universal joint connected to one of said driving or driven elements.

* * * * *